United States Patent [19]
Leloux

[11] 3,755,049
[45] Aug. 28, 1973

[54] DEVICE FOR REMOVING TWO THIN LAYERS SITUATED ON EACH OTHER

[75] Inventor: Arnoldus Willem Jan Leloux, Dedemsvaart, Netherlands

[73] Assignee: Industriele Onderneming Wavin N.V., Zwolle, Netherlands

[22] Filed: Sept. 24, 1971

[21] Appl. No.: 183,320

[30] Foreign Application Priority Data
Sept. 30, 1970 Netherlands....................... 7014402

[52] U.S. Cl..................... 156/584, 29/239, 53/386, 81/3 R
[51] Int. Cl........................ B32b 35/00, B23p 19/04
[58] Field of Search.......................... 156/584, 344; 81/3 R; 29/239; 53/386

[56] References Cited
UNITED STATES PATENTS
2,689,073  9/1954  Twigg................................... 53/386
2,281,516  4/1942  Royal.................................... 53/386

Primary Examiner—Douglas J. Drummond
Attorney—Richard Wiener

[57] ABSTRACT

A device for removing two thin flexible thermoplastic layers of a tubular foil from each other comprising a first elongated member with a W-shaped cross section and a second elongated complementary member with a W-shaped cross section, whereby both members have a first aperture lying opposite each other in the cooperative state of the members, each member being provided with a second opening being situated at different sides of the first aperture, the lower of the elongated members for supporting the foil having a projecting elongation.

4 Claims, 2 Drawing Figures

Patented Aug. 28, 1973

3,755,049

INVENTOR
ARNOLDUS W.J. LELOUX
BY Richard Wiener
ATTORNEY

DEVICE FOR REMOVING TWO THIN LAYERS SITUATED ON EACH OTHER

BACKGROUND OF THE INVENTION

My invention relates to a device for removing two layers, situated on each other, of thin, smooth, flexible and easily deformable material, particularly layers of a foil consisting of a thermoplastic material.

So far it has been found very difficult to remove e.g. two thin layers, situated on each other, of thin, smooth, flexible and easily deformable material, particularly layers of a tubular plastic foil. Owing to the increasing use of these tubular foil pieces for manufacturing plastic block bags one is, however, obliged to take steps for opening the tubular foil at one or both ends, so that the desired bottom squares can be folded. In practice, however, difficulties are encountered since the foil layers situated on each other adhere strongly and can only be separated with difficulty. This disadvantage increases on account of the fact that on severing a piece of tubular foil from a long web or tubular foil the layers of the tubular foil lying on each other adhere strongly to one the other at the location of the severed edges and can only be separated with difficulty.

SUMMARY OF THE INVENTION

It is an object of the invention to provide a device with which these difficulties are obviated so that the two pieces of foil situated on each other can each be easily removed, or to open a piece of tubular foil at one or both ends so that in a simple way a bottom square can be formed from the piece of the tubular foil.

This object of the invention is attained in that a device for removing two thin layers of thin, smooth, flexible and easily deformable material, particularly foil layers, lying on each other, consisting of thermoplastic material, is distinguished in that it has two members which can be moved towards and away from one the other, viz. a first member and a second, preferably elongated, member with suction apertures for sucking a foil layer.

Due to the application of suction apertures, particularly in the two members, the layers, situated on each other, can be pulled from apart when the members are separated.

Advantageously the first faces of a member, cooperating with a thin layer have a V or arcuate section, while the second faces, of the other member, cooperating with a thin layer have a complementary section related to the faces of the first member, and suction apertures are provided in the first and second face. A V-section has been found to be very practical.

Due to the application of a V-shaped or arcuate cross section it is achieved that the foil layers adhere easily to the members. On using a flat member the foil will, due to the air and other resistances and on account of its minor rigidity be easily peeled off from the suction apertures, particularly when such members are moved at some speed. As a consequence of the V-section of the members, this symptom appears to a lesser extent since the foil makes an angle with the direction of movement of the members and as a result will be rather pushed from the suction apertures which, however, will be prevented since in this direction the foil can only be shifted with difficulty, because owing to the vacuum slight depressions form in the foil or the thin layer which depressions are caught in the suction apertures.

Another advantage of the application of a V-shaped or arcuate cross section of the members is that the tubular foil walls are shifted with respect to each other and as a consequence are slightly worked loose.

Still another advantage is in that the one layer of tubular foil is sucked into an interior angle, while the layer of tubular foil situated thereon, due to its elasticity, tends to stand straight, whereby a separating effect between the walls of the tubular foil is intensified.

Finally the foil obtains, when the members have the above mentioned cross sections, a certain rigidity in the longitudinal direction of the members and continues to seal adequately the vacuum.

According to a particular embodiment the cross section of the first member with the V or arcuate shape has a first supplementary surface, cooperating with the foil layers and making an angle with the V, while the cross section of the second member has also a supplementary surface which, on cooperating with the first supplementary surface, is adapted thereto. In this way a W-shaped deformation of the foil layers can be obtained whereby the afore-mentioned advantages of the V-shaped section is still enhanced.

The invention is hereinafter clarified with reference to the drawings in which an embodiment is represented.

DESCRIPTION OF PREFERRED EMBODIMENTS

Figure 1:
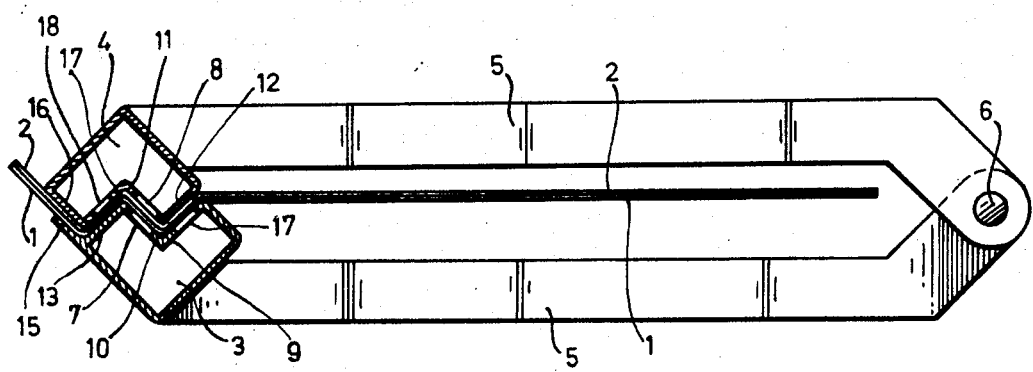
FIG. 1 is an embodiment of the device according to the invention in a condition in which the two members cooperate.
Figure 2:
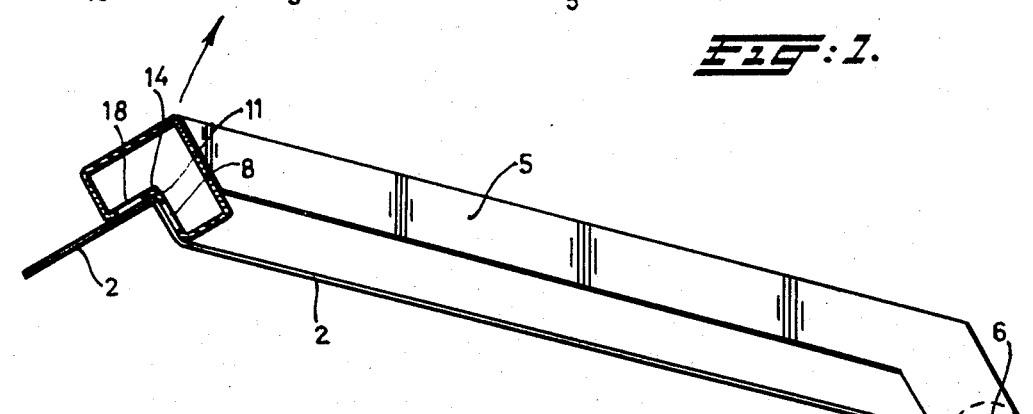
FIG. 2 shows the same device, the members being, however, moved apart whilst taking along two layers of foil.

In FIG. 1 and 2 a device is represented for moving apart two layers 1 and 2, situated on each other, of a tubular foil made of thermoplastic material, e.g. polyethylene.

This device comprises a first member 3 and a second member 4, which can be moved towards and away from each other. For that purpose the members 3 and 4 are connected with arms 5 which are hingedly connected at 6. Through means known per se, the arms 5 can be moved towards each other or away from each other and as a consequence, the same applies to the members 3 and 4. In the first elongated member 3 are suction apertures in the shape of an oblong suction channel 7, while on the likewise elongated member 4 an oblong suction channel 8 is provided. It is obvious that the same results can be obtained by providing a series of consecutive apertures 7 and 8 in members 3 and 4. The foil layers 1 and 2 are drawn against members 3 and 4 by the suction at apertures 7 and 8.

Faces 9 and 10 of the first member 3, cooperating with a thin layer 1, form a V, while faces 11 and 12 of the second member 4, cooperating with a thin layer 2, likewise form dovetails with the V section formed by faces 9 and 10.

In the embodiment represented, the cross sectional area of the first member 3 comprises a supplementary surface 13 making an angle with the V formed by surfaces 9 and 10, and capable of cooperation with the foil layer 1.

The cross section of the second member 4 is likewise provided with a supplementary surface 14. In addition, surfaces 15 and 16 can be provided cooperating with the layers of foil and making an angle with faces 13 and 14, respectively.

As shown in FIG. 1, the cross sections of members 3 and 4 are W-shaped, thereby augmenting the advantages described for a V-section.

Besides apertures 7 and 8 which face each other, a second aperture 17 is provided in surface 9 of the first member, while in the face 14 of the second member an aperture 18 is provided. As can be seen, these apertures are located in the first and in the second member, as contemplated in cross section, on opposite sides from respective first apertures 7 and 8.

The device operates as follows:

A tubular foil of thermoplastic material in the shape of polyethylene, with foil layers 1 and 2, is introduced between the first and second members 3 and 4, respectively. Due to the cooperation of these members 3 and 4, the foil layers situated on each other are deformed to a W-section, thereby producing both a separation of the respective walls of the layers, and good adherence of the layers to the surfaces of the first and second members 3 and 4, respectively.

After creation of a vacuum at apertures 7, 8, 17 and 18, the arms 5 are moved apart, thereby separating members 3 and 4. Foil layer 2 continues to adhere to aperture 8 in face 11 and to aperture 18 in face 14, while foil layer 1 continues to adhere to surfaces 9 and 14 due to the suction at apertures 17 and 18. After the separation of foil layers, the vacuum is broken, whereupon the foil layers are released and the tubular foil can be unfolded.

Thereupon this tubular foil can be easily folded in the block bag bottom known per se.

What I claim is:

1. A device for separating two layers of thin, smooth, flexible and easily deformable material, particularly layers of thermoplastic foil, comprising a first member having first surfaces forming a substantially V shape in cross section and adapted to contact the first of the said layers, a second member having second surfaces forming a substantially V shape in cross section and adapted to contact the second of the said layers, the said first and second surfaces being adapted to cooperate with each other and being provided with suction means for holding and releasing the respective thin layers.

2. A device according to claim 1, wherein the cross section of the first member with the V-shape or arcuate shape has a first supplementary surface, cooperating with the foil layers and making an angle with the V, while the cross section of the second member also has a supplementary surface which, on cooperating with the first supplementary surface, is related thereto.

3. A device according to claim 1, wherein the suction means comprises apertures in the said first and second members, at least one of the apertures in the said first member being situated opposite an aperture in the said second member, and at least a second aperture in the first member and a second aperture in the second member being situated on different sides of the first aperture as contemplated in cross section.

4. A device according to claim 1, wherein the faces of a member, cooperating with a thin layer, have a W-section, while the faces of the other member, cooperating with a thin layer, have a W-section adapted to the former W-section.

* * * * *